Oct. 6, 1959     W. A. BAILEY     2,907,592
TAKE-OFF FOR FLUID DUCTS

Filed Nov. 29, 1957     3 Sheets-Sheet 1

INVENTOR
*WILLIAM ALBERT BAILEY*
by R. J. Filipkowski
AGENT

Oct. 6, 1959 W. A. BAILEY 2,907,592
TAKE-OFF FOR FLUID DUCTS
Filed Nov. 29, 1957 3 Sheets-Sheet 3

INVENTOR
WILLIAM ALBERT BAILEY
by R. J. Filipkowski
AGENT

2,907,592
TAKE-OFF FOR FLUID DUCTS

William Albert Bailey, Sarnia, Ontario, Canada

Application November 29, 1957, Serial No. 699,837

6 Claims. (Cl. 285—219)

This invention relates to the fabrication of ducts, and particularly concerns improved fittings for connecting the end of a thin-walled metal tube to an aperture in a wall of sheet metal or the like.

In the heating, ventilating, and air-conditioning trades the guiding and conveying of air is mainly carried out in a network of ducts. In a typical present day installation the air-handling unit which may be a forced air furnace, a cooling unit, a blower, or combinations thereof, is placed in position in a dwelling or an industrial plant, and a system of delivery and return trunk ducts communicating with the spaces in the building is installed and connected with the unit. Such main supply ducts, which are usually thin-walled and fabricated of sheet metal, generally take the form of an extended plenum leading in one or more directions from the discharge opening in the unit, to deliver air under slight pressure to the various parts of the building. A similar return duct leads from various areas of the building to the intake of the unit. Heretofore the connection of leader pipes and branch networks to the main trunk plenums has been a relatively costly part of the installation, and the preparation of fittings involves laborious procedures.

To fasten the conventional take-off fitting into an extended plenum, it is necessary to insert a prepared serrated flange into a corresponding opening cut in the plenum wall, and the serrations are then clinched on the inside of the wall by means of a hammer, there being a peripheral shoulder raised from the fitting against which the wall bears. Such a joint, commonly known in the sheet metal trade as a fish lock or hammer lock, involves considerable manual labor, occasionally requires the efforts of two men to make a connection, and if the plenum take-off fitting is to be installed at or near the middle of a relatively long section of the plenum the difficulty is considerably increased, often resulting in an inferior connection.

The present invention seeks to provide a take-off fitting which avoids the necessity of reaching inside the plenum, is simple to fabricate and requires no tools whatever for its attachment, the fitting being designed to be threaded by manually rotating it between a half and a whole turn against the wall of the plenum in registry with a circular aperture cut therein. A short radial slit is first made in the plenum wall communicating with the aperture, as by means of hand shears, and the adjacent edges are slightly separated in opposite directions relatively to the plane of the wall, which separation will inherently occur by the cutting action of conventional hand shears, while a prepared fitting having a radially severed terminating flange and a sinusoidal re-entrant peripheral fold or groove formed on its end is mated with the slit, whereupon relative rotation of the parts produces a threaded engagement. Moreover according to the invention the fitting may at any time thereafter be removed, or it may be permanently bonded to the wall as by means of solder or a cement.

Essentially the invention consists in a fitting having a thin wall and a circular aperture in its end which has been fabricated by rolling a first outwardly bulged radial peripheral groove adjacent the end to be attached, forming a second peripheral groove adjacent the first groove and lying between the end of the fitting and the first groove and radially inwardly directed and flanging the end radially outwardly, then slitting the flange and the sinusoidally folded section along the intersection therewith of a diametral plane which includes the axis of the fitting. A small relative displacement between the severed ends of the order of the thickness of the sheet metal wall into which it is to be inserted is made both radially and axially during fabrication in a corresponding circular hole in a sheet or wall.

In carrying the invention itno effect a preferred embodiment of a take-off fitting comprises a cylindric or conic shell body made of sheet metal having a locked longitudinal seam which is terminated short of the attachment end of the fitting, and a raised shoulder, a pheripheral groove and a flange are formed in the material lying between the end of the seam and the end of the fitting. Such fitting is attached to a plenum wall by cutting a circular aperture in the latter having a diameter only slightly greater than the diameter of the inwardly bulged shoulder and a radial slit at least as long as the flange on the end of the fitting is cut extending into the circular aperture and a slight separation is made between the edges of the slit, whereupon the ends of the flange on the fitting may be mated with the edges of the slit so that relative rotation of the fitting threadedly engages it into the wall. About three-quarters of a turn provides a secure attachment, which is relatively air-tight, requiring a few seconds at most for its installation.

Alternatively the fitting may comprise a seamless cylindrical tubular body or a tubular body having a conically flared end, with the terminal section formed by a sinusoidal corrugation to produce a peripheral raised shoulder and an adjacent peripheral groove, terminating in a radially outwardly extending flange.

The practice of the invention may be the better understood by reference to the accompanying figures of drawing wherein.

Figure 1:
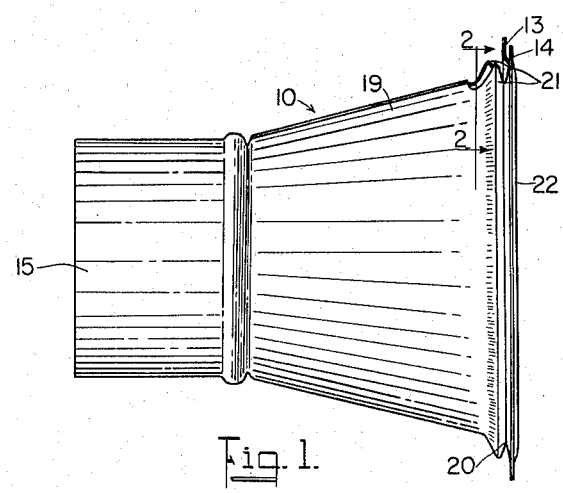
Fig. 1 is a side view of a conic sheet metal fitting.
Figure 2:
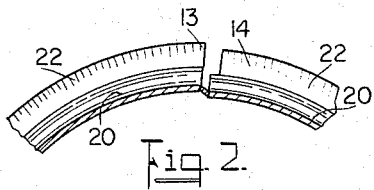
Fig. 2 is a section taken on a plane perpendicular to the axis of the fitting looking toward the attachment end thereof.
Figure 3:
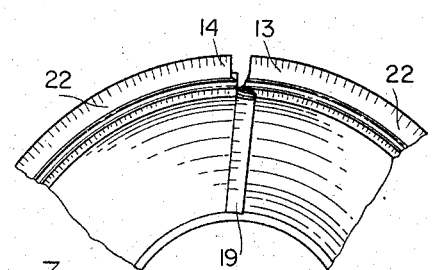
Fig. 3 is a partial end view of the severed peripheral portion of the fitting of Fig. 1 looking into the attachment end.

In the drawings, a take-off fitting generally indicated at 10 having a discharge end 15, is provided with a radially outwardly extending flange 22, which is cut along a longitudinal axial plane and whose inner end 14 and outer end 13 are relatively axially spaced apart. The flange 22 is integral with an adjacent inwardly formed ridge or groove 21, which in turn merges with the radially outwardly raised shoulder or ridge 20. While the drawing shows the ends of the corrugated terminal portion as being exaggeratedly axially and radially displaced for the purposes of facilitating an understanding of the invention, such displacement is not a prerequisite, inasmuch as the ends will automatically be shifted relatively to each other during the step of making the connection.

Referring in particular to Figs. 1, 2, 3, and 8, a reducer coupling having a conic section joined to a smaller cylindric pipe is made of sheet metal employing a lock seam 19, the seam being terminated just short of the peripheral ridge 20 by cutting away overlapping portions of stock prior to the seaming operation. The grooves 20 and 21 are rolled by conventional forming means, and the flange 22 is turned out. Thereafter the edges of the formed portion including the flange are trimmed if necessary to avoid overlap but the tangential separation is kept as small as practicable. The lips 13 and 14 of the fitting are spread apart.

Figure 4:
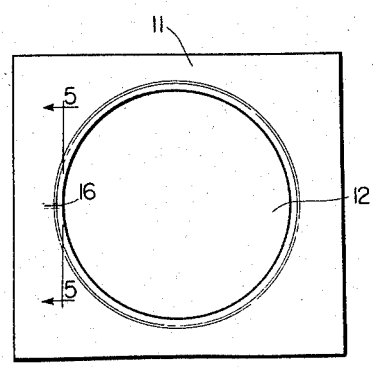
Fig. 4 is an elevation view of a sheet metal wall having an aperture and a radial slit adapted to receive the fitting of Fig. 1.
Figure 5:
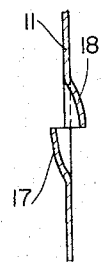
Fig. 5 is a section taken on line 5—5 in Fig. 4, showing the lips formed by separating the adjacent edges of the slit.
Figure 6:
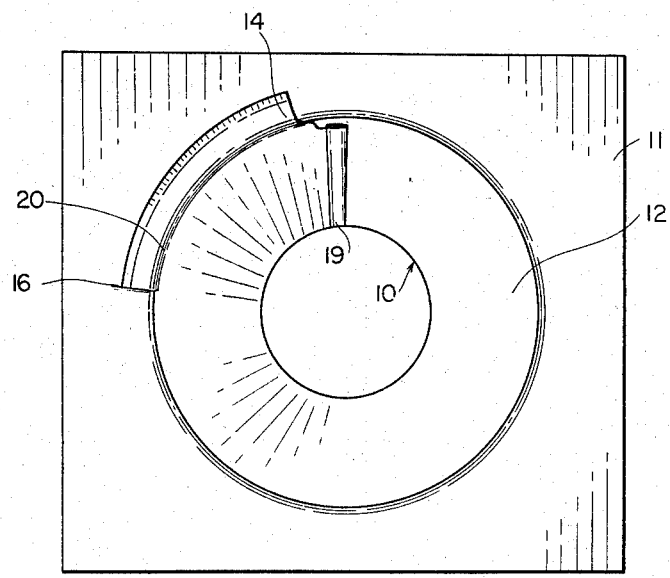
Fig. 6 is a view looking outwardly from a plenum towards a fitting being inserted into the wall of Fig. 4.

Turning now to Figs. 4 and 5, a wall 11 of a sheet metal duct or chamber, having a thickness approximately the same as that of the sheet metal fitting of Fig. 1, has a circular aperture 12 cut out having a diameter not less than the inner diameter of the inwardly directed grove 21, and not greater than the outside diameter of the outwardly directed ridge 20. Slit 16 is cut radially from the edge of the aperture having a length at least as great as the combined length of the flange 22 plus the folded portion designated 21. The lips 17 and 18 are spread slightly as in Fig. 5 in the same relative sense as the separations of lips 13 and 14 of the fitting, so that these parts may be mated and caused to threadedly engage. The spreading is often adequately done automatically when cutting light gauge metal with tin snips.

Figure 8:
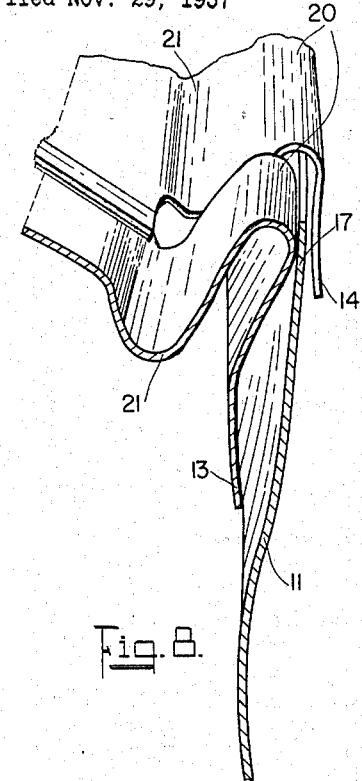
Fig. 8 is a section taken on line 8—8 of Fig. 7.
Figure 11:
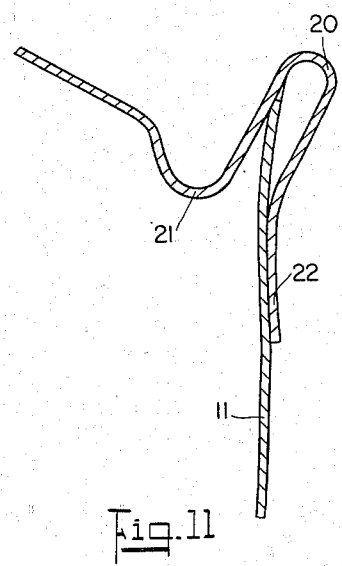

Referring to Figs. 8 and 11 which are in enlarged scale representation, the relative radial and axial separations of the lips 13 and 14 may be seen, and the relative co-operation of the fitting with the wall 11 and aperture 12 may be understood.

Figure 7:
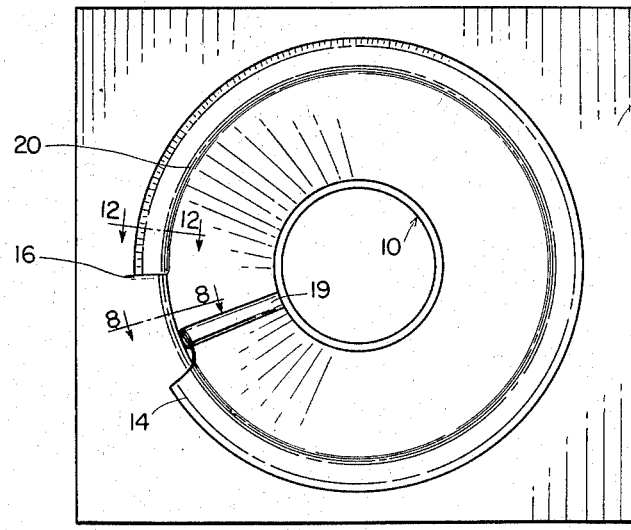
Fig. 7 is a view similar to Fig. 6 showing the fitting being rotated into place.

An exceedingly strong attachment means is provided, as may be appreciated by observing that the wall 11 is gripped between flange 22 and the connecting material between corrugations 20 and 21, over a fraction of the periphery, and in the remaining peripheral portion the wall bears against the outer side of flange 22. When the fitting has been rotated more than half a turn, all of the inner edge of aperture 12 as illustrated in Fig. 7 rests in the inwardly formed groove 20, gripped between the flange 22 and the material lying between corrugations 20 and 21.

Figure 9:
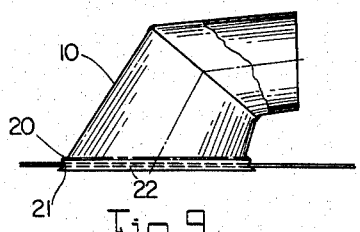
Figs. 9 and 10 are side views showing alternative embodiments of the fitting connected to a wall, and, Fig. 11 is a further section through the mating parts taken on line 12—12 of Fig. 7.

A branch or leader connected to the plenum may be led therefrom in any desired direction, by suitably terminating the fitting by an elbow, and by leading the fitting itself out of the wall in a direction such that its axis makes an angle less than 90 degrees with the plane of the wall, as shown in Fig. 9. In this embodiment the sheet metal shell body is formed having an elliptic contour, on any plane transverse to its axis, whereby its contour on the wall 11 is circular, thereby permitting threaded engagement to be effected with the aperture 12. In practice the fitting may be fabricated conventionally from customary gauges of sheet metal, affording sufficient flexibility of the body walls so that the cross-section of the attachment end may be distorted during installation to conform to the circular section required.

Figure 10:
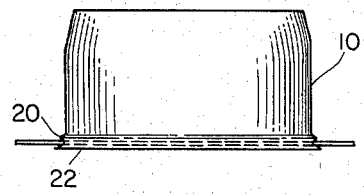

In general the usual lead-out may be straight, and the conic form is not necessarily always required, inasmuch as cylindric pipes as in Fig. 10 are generally preferred where no important change in velocity of the fluid conveyed occurs within the length of the fitting. Such cylindric pipes may themselves be very short, taking the form of nipples having free outer ends 15.

The reduction of diameter of the discharge end 15 of a fitting may be preferred where the desired velocity at the discharge end is to be higher than at the entry opening, as where warmed air is delivered under a few ounces hydrostatic pressure from an extended plenum to be discharged from a leader pipe into a room as a jet of relatively high velocity.

While the drawing and description have been concerned with seamed sheet metal fabricated fittings which inherently provide discontinuity around the periphery of the formed end, it is entirely within the practice of the invention to form a sinusoid corrugation terminated by a disc flange on the end of a seamless tube or pipe, thereafter severing flange and folds as by cutting with a saw. Such fitting may readily be inserted. It is not necessary to sever the fold 21 of a seamless fitting, and the cut may extend only part way into the material between the ridges 20 and 21.

Moreover, in fabricating a fitting from tubular seamless stock, more than one, e.g., two or three or more longitudinal cuts may be made with equal peripheral spacing in the formed end and a corresponding number of radial slits may be made in the wall 11, to reduce the amount of angular rotation required for coupling the parts.

The operation of attaching or removing the take-off fitting is quite simple, and the amount of rotation need not be appreciably over a half revolution when the flange 22 is inserted sideways and the fitting rotated to seat the edge of wall 11 in fold 20. The exact procedure is as follows: The fitting is held with its opening toward the circular cut-out, and the ends 13, 14 are radially introduced to straddle the wall at a point 180 degrees from the slit 16. The fitting is swung clockwise around a pivot point between the ends 13, 14, sufficiently to allow flange 22 to be inserted into slot 16. The fitting is swung counter-clockwise to bring half of the peripheral extent of flange 22 within the plenum, with the aperture edge seating in the fold 20. Such emplacement will be found to produce a rigid attachment, particularly if flange 22 is at least about 4% of the diameter of the circular cut-out and fold 20 is not too broad. A further rotation by as little as 20 degrees produces a joint that resists any lateral forces directed in the plane of wall 11. When ends 13 and 14 are registered over lips 17, 18, by further rotation, all of flange 22 will lie within the plenum and the edge of the circular cut-out will be entirely seated in fold 20.

I claim:

1. A joint for detachable attachment of an end of a tube to a planar sheet coaxially of a circular aperture in said sheet, comprising a radially protruding disc flange integral with and terminating said tube, a circumferential groove having a U-shaped cross section in a longitudinal axial sectioning plane through said tube formed adjacent said end and having side walls disposed about a fold axis obliquely inclined with respect to the tube axis, the radially outer margin of one side wall having a junction with the inner margin of said flange whereby the plane of said flange intersects the other side wall, said flange and said one side wall being radially severed, and the aperture having a diameter correlated with the diameter of the other side wall at the intersection of the flange plane and having a radial split extending inward into the aperture, whereby to permit entry of said sheet aperture within said groove by relative rotation of said tube with respect to said sheet for resiliently clamping said sheet between said other side wall and said flange.

2. A joint as in claim 1 wherein said other side wall is joined with said tube by a peripherally formed ridge, and said aperture diameter is substantially equal to the external diameter of said tube.

3. A take-off fitting for detachable attachment coaxially with a circular aperture in a plane-walled duct comprising a non-rigid shell body having a terminating annular disc flange flaring radially therefrom, a peripheral inward fold coaxially formed about said shell body having an internal diameter less than said aperture diameter and having one fold wall connected with said flange and the other fold wall connected with said shell body, said fold walls having the form of annuli or truncated conic shells coaxial with said shell body having their apices external to the shell body and axially spaced so that the plane of said flange intersects said other fold wall, said flange and said one fold wall being radially severed and the margin of said aperture being radially split for receiving said flanged end of said shell body in coaxially registering relation in contact with one surface of said duct wall and to seat said aperture on said other fold wall upon relative rotation of said shell body with respect to said duct.

4. A take-off fitting as in claim 3 wherein said second fold wall is integrally joined with a peripherally ridged portion of said shell body.

5. A separable joint for connecting a resiliently deformable tubular shell to a sheet coaxially of a circular aperture in the plane of said sheet, comprising a circumferential groove inwardly formed adjacent an end of said tube having a first conoid band portion connected along its outer margin with an end of said tube and a second like conoid band axially spaced from said first band and from said tube by a fold integrally joining the inner margins of said bands, said bands having like obtuse apical angles such that the plane of the sheet is tangent with the outer marginal edge of the second band and intersects the first band intermediate its inner and outer margins, and an outwardly flaring disc flange integrally joined with the outer margin of the second band, a radial slit severing said flange and said second band, said aperture having a radius intermediate the radii of the inner and outer margins of said first band and said sheet having a radial slit communicating with said aperture of greater extent than the radius of said flange, the segments of said flange and of said aperture adjacent said slits being axially deformable whereby to permit entry of said tube flange by relative rotation thereof with respect to said sheet into said aperture when said slits are juxtaposed.

6. A joint as in claim 4 wherein the aperture diameter is less than the diameter of the intersection on said second band of a plane tangent with said flange but greater than the diameter of the inner margin of said second band.

References Cited in the file of this patent

UNITED STATES PATENTS

| | | |
|---|---|---|
| 455,502 | Bayles | July 7, 1891 |
| 687,556 | Carter | Nov. 26, 1901 |
| 1,777,977 | Lente | Oct. 7, 1930 |
| 2,392,220 | Bruhn et al. | Jan. 1, 1946 |
| 2,463,593 | Boardman | Mar. 8, 1949 |

OTHER REFERENCES

Standard Catalogue No. 55, Standard Furnace Supply Co., Omaha, Nebraska, copyright 1955.